June 11, 1957  L. G. WELLER  2,795,463
PNEUMATIC CONVEYING SYSTEMS
Filed March 11, 1953  6 Sheets-Sheet 1

FIG. 1.

INVENTOR.
LEO G. WELLER
BY Pennie Edmonds Morton
Barrows Taylor
ATTORNEYS

FIG. 2.

June 11, 1957 L. G. WELLER 2,795,463
PNEUMATIC CONVEYING SYSTEMS
Filed March 11, 1953 6 Sheets-Sheet 3

FIG. 3.

INVENTOR.
LEO G. WELLER
BY Pennie Edmonds Morton
Barrows Taylor
ATTORNEYS

June 11, 1957 L. G. WELLER 2,795,463
PNEUMATIC CONVEYING SYSTEMS
Filed March 11, 1953 6 Sheets-Sheet 4

INVENTOR.
LEO G. WELLER
BY Pennie Edmonds Morton
Barrows Taylor
ATTORNEYS

June 11, 1957  L. G. WELLER  2,795,463
PNEUMATIC CONVEYING SYSTEMS
Filed March 11, 1953  6 Sheets-Sheet 6

INVENTOR.
LEO G. WELLER
ATTORNEYS

United States Patent Office

2,795,463
Patented June 11, 1957

2,795,463

PNEUMATIC CONVEYING SYSTEMS

Leo G. Weller, North Catasauqua, Pa., assignor to Fuller Company, Catasauqua, Pa., a corporation of Delaware Application March 11, 1953, Serial No. 341,667

13 Claims. (Cl. 302—3)

This invention relates to pneumatic conveying systems of the positive pressure type for pulverulent, granular and crushed material, and more particularly, the invention is concerned with a conveying system of the type described in which the material conveyed is flour and the conveying system is adapted for utilization in the bakery industry.

The apparatus of the invention is especially designed for conveying large quantities of pulverulent material, such as flour and other pulverulent food products, dry, finely divided chemicals, and other finely divided material, especially those which do not flow freely from ordinary storage receptacles.

In the prior bakery systems the conveying means have, in general, been confined to screw conveyors and bucket elevators. Many disadvantages are characteristic of these types of conveyors, namely, high power consumption, difficulty in starting under a load, maintenance, and the inability to completely discharge the material being conveyed. The inability to completely discharge the material being conveyed is of utmost importance in the bakery industry due to the various federal, state and local sanitary codes. The dead spaces in the screw and bucket conveyors where the material accumulates and remains stationary during the use of the equipment are generally centers for insect infestation and provide an ideal opportunity to propagate. Furthermore, during conveying with the prior types of equipment the products escape in the form of dust and float through the air and settle upon all horizontal surfaces in the plant, and when an appreciable layer of dust has accumulated, the dust provides an ideal place for insect propagation throughout the plant. In many plants it is a routine practice to clean and fumigate at regular intervals, but this presents a disadvantage in that the plant must close for a period of time and, in general, the use of fumigants is objectionable. During this periodic cleaning the dead spaces and the horizontal surfaces are cleaned, but normally the products which are thus removed are infested and must be discarded, which represents a substantial loss.

Furthermore, in plants where two or more different materials are used, such as the different types of flour, the material which collects in the dead spaces of the conveyor must be cleaned out when a different type of material is to be conveyed; otherwise, the subsequently conveyed material becomes adulterated by the prior accumulations in the system.

In the prior type conveying systems the blending of different types of material, such as flour, has been most difficult and cumbersome. An elaborate arrangement of screw conveyors has been necessary to convey the various ingredients to a common receptacle. No means for blending the material while it is being conveyed can be provided with the use of screw conveyors, and the only blending that can be accomplished is that produced in a separate mixer. A further disadvantage in blending equipment of the prior art is that the same type of material must be conveyed by each screw conveyor to maintain an accurate proportioning of the material. This is due to the fact that a screw conveyor is not self-cleaning and the material left in the conveyor will adulterate the subsequently conveyed material if the screw conveyor housing has not been cleaned.

In contrast with the previous types of conveying systems, the apparatus of the present invention provides an economical, dust free, conveying system that overcomes the difficulties encountered with the prior types of conveying systems.

The apparatus of the present invention comprises, generally, a pulverulent material handling system wherein the material enters the system by means of a bag dump hopper provided with means for regulating the flow of different types of material into the system. Means are provided for withdrawing the material from the bag dump hopper, and a stream of air is passed through the withdrawing means for entraining and conveying the material from the withdrawing means. The material is conveyed to a first air-material separator where the material is separated from the air stream and discharged into a classifier. The classifier separates the material into a fine fraction and a coarse fraction. Means are provided for withdrawing the fine fraction of material from the classifier and entraining this material in a second air stream. This second air stream is preferably the air separated in the first air-material separator. The material removed from the classifier is conveyed to a second air-material separator where the material is separated and discharged into a material receiver. Means are provided for withdrawing the material from the material receiver and entraining the material in a third stream of air. The material is conveyed in the third air stream through a distributing valve to a third air-material separator. Conveying means are provided to extend from the distributing valve back to the second air-material separator. A scale bin hopper is provided beneath the third air-material separator for measuring predetermined amounts of the material being conveyed. Means operable upon the discharge of a predetermined amount of the material from the third air-material separator into the scale hopper bin are provided to selectively operate the distributing valve to divert the material stream from the third air-material separator back to the second air-material separator.

Each material confining space must be relieved of the pressure created by the pressure of the air conveying stream for proper functioning. A fourth air-material separator is provided having conveying means connected to each of the material confining spaces. Dust laden air is conveyed from each of the material confining spaces to the fourth air-material separator wherein the material is separated and returned to the system and the air is exhausted to the atmosphere after having passed through an air filter.

The apparatus of the present invention provides a means for conveying pulverulent material, such as flour, that is completely self-cleaning in that all of the flour may be discharged from the system without leaving any deposits wherein infestation may take place. It is well known that the aeration of flour will prevent propagation of insect life, and this preventative feature is an inherent characteristic of the present invention. This new bakery unit, although utilizing air under pressure as a conveying means, is free of all dusting characteristics. This system is a closed system wherein all conveying air is passed through a separating means to remove all dust before it is discharged to the atmosphere.

It can be readily seen that the bag dump hopper provides a unique method for blending different types of flour into a conveying system by the provision of a proportioning means in the center of the bag dump hopper. As predetermined amounts of different types of flour are placed in the bag dump hopper, a continual blending takes place as the material is being conveyed through the system without the provision of any additional apparatus for the complete blending of the ingredients.

The apparatus of the present invention will be more fully described in conjunction with the accompanying drawings, in which.

Figure 1:
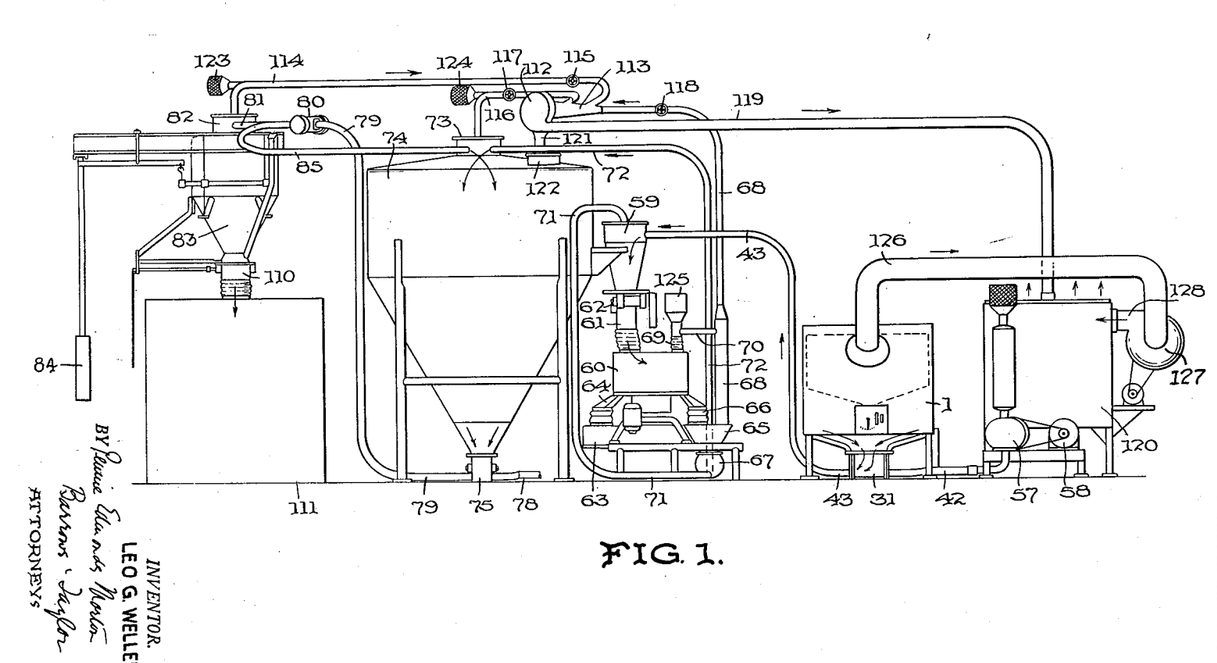
Fig. 1 is a schematic diagram of the conveying and blending system.

In the embodiment of the invention shown in Fig. 1 the pneumatic conveying system for a bakery is disclosed schematically.

A bag dump hopper 1 is provided for introducing a material such as flour into the conveying system. As disclosed in Figs. 2, 3, 4, 5 and 6, it is seen that the bag dump hopper 1 comprises a housing 2 having side walls 3 and 4 and an end wall 5 curved to form a hood over the upper portion of the hopper. The bottom of the housing 2 is formed by two sloping side walls 6 and 7 and gas permeable members 8 and 9 inclined with respect to the horizontal. The slope of the walls 6 and 7 is of a sufficient degree to permit material such as unaerated flour to flow freely down the slope onto the upper surfaces of the gas permeable members.

Figure 2:
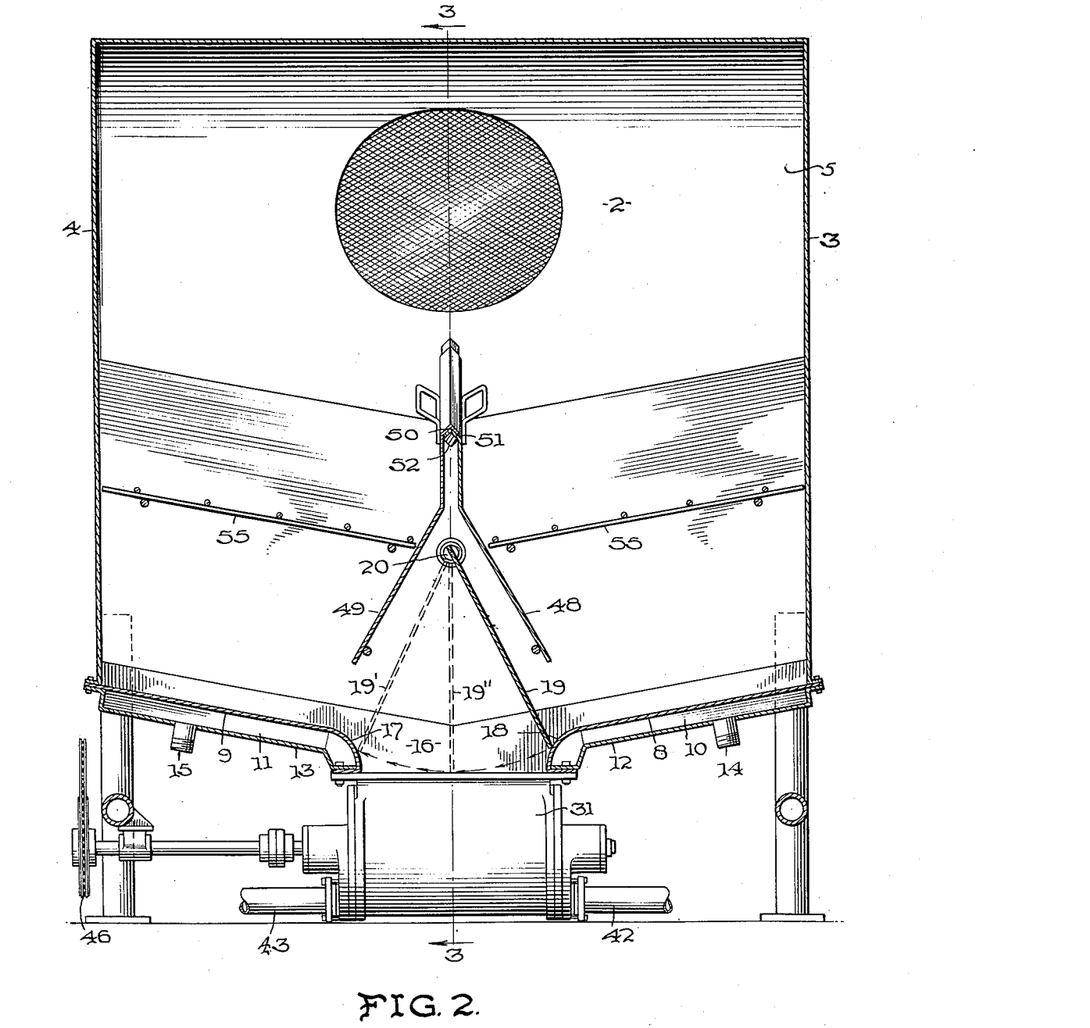
Fig. 2 is a sectional elevation of the bag dump hopper.
Figure 3:
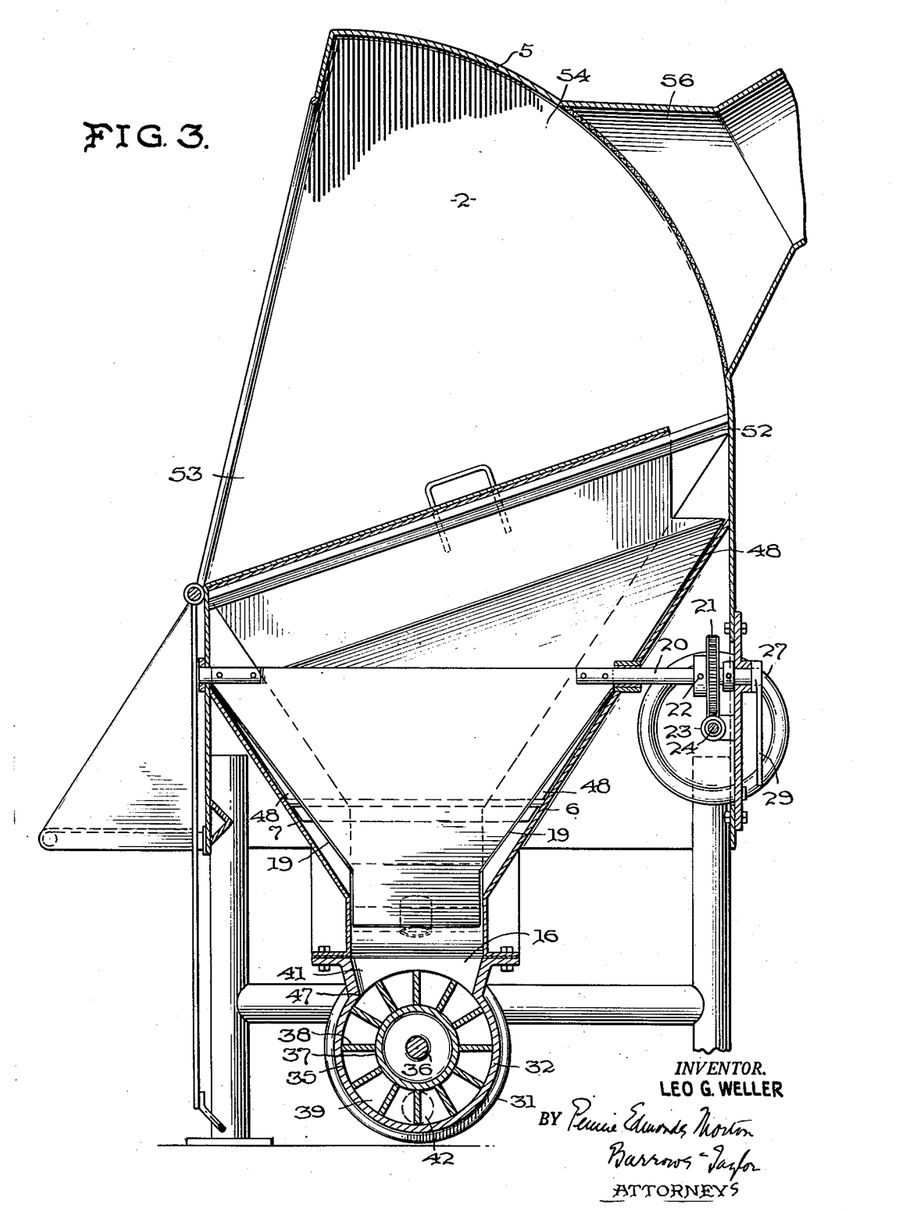
Fig. 3 is a cross-sectional elevation along line 3—3 of Fig. 2.

Plenum chambers 10 and 11 extend along and beneath each of the gas permeable members. Pipes 14 and 15 are provided for supplying gas under pressure to the plenum chambers to pass a gas through the gas permeable members and into material lying upon their upper or material conveying surfaces to aerate such material.

The term "aeration" is employed herein to mean penetration of any gas, not necessarily air, into the material above the gas permeable members at sufficient speed to expand the material and thereby reduce the particle to particle friction, but not at a speed sufficient to entrain particles of material in the gas stream.

When a pulverulent material is aerated by passage of a gas through a horizontal permeable member into the material, the material forms a definite angle with respect to the gas permeable member. This angle is termed the angle of repose of the aerated material and is substantially less than the angle of repose of the same material before aeration. If the gas permeable member is inclined with respect to the horizontal at an angle at least as great as the angle of repose of the aerated material, aeration of the material will cause the material to flow by gravity along the conveying surface of the gas permeable member to the lowermost end thereof. The angle of repose of an aerated pulverulent material is dependent upon the characteristics of the particular material, and varies with different materials. However, it has been found that if the gas permeable member has an inclination with respect to the horizontal of from about 4° to about 15°, practically any material which may be aerated will, when aerated, flow down such a member by gravity. Accordingly, the gas permeable members 8 and 9 preferably are so disposed that their upper or material conveying surfaces form an angle with respect to the horizontal at least as great as the angle of repose of the material in its aerated state.

It is not necessary that air be used to aerate the material. The gas fed into the plenum chambers 10 and 11 usually will be a gas which is inert with respect to the particular material being placed in the bag dump hopper. The gas may also be heated or refrigerated, and, in some cases, it may be a gas which is chemically reactive with the material, depending upon the particular material and the characteristics which it is to have when discharged from the bag dump hopper. The gas permeable members advantageously are constructed of multiply canvas, but may be of any gas permeable material having a permeability not substantially greater than 5. The term "permeability," as herein employed, is defined as the amount of air measured in cubic feet at 70° F. and 25% relative humidity which will pass through an area of 1 sq. ft. of dry, porous stone in one minute when tested under an equivalent pressure differential of 2" of water.

A discharge opening 16 in the bottom of the housing 2 is formed by the positioning of the two conveying surfaces 8 and 9 and the sloping side walls 6 and 7. The conveying surfaces 8 and 9 are curved into the opening 16, as at 17 and 18, to provide a smooth uninterrupted flow of material from the conveying surfaces into the discharge opening.

A movable baffle plate 19, positioned on a shaft 20, extends across the opening 16 from the side wall 6 to the side wall 7 and is shaped to conform to the slope of the two side walls. The shaft 20 is rotatable to describe an arc for the baffle plate extending from the conveying surface 8 to the conveying surface 9 between the two curved portions 17 and 18. The shaft 20 extends through the side wall 6 and is provided with a regulating mechanism for accurately positioning the baffle plate 19.

Figure 4:
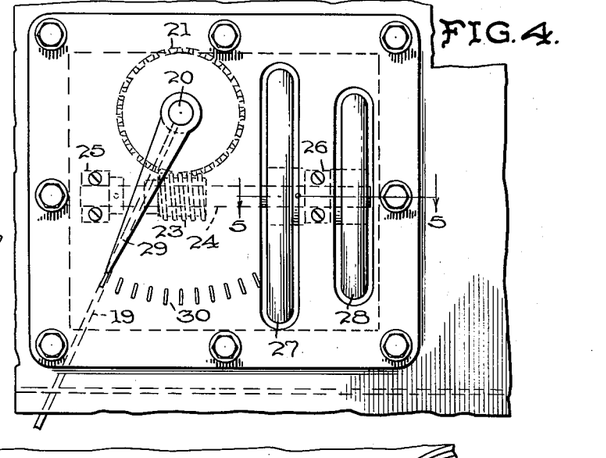
Fig. 4 is a fragmentary elevation of the regulating mechanism for the bag dump hopper.

The regulating mechanism comprises a gear 21 positioned on a shaft 20 and secured thereto by means of a pin 22. The gear 21 is mated with a worm gear 23 mounted on a shaft 24. The shaft 24 extends between the bearings 25 and 26 and is rotated by means of a hand wheel 27. As shown in greater detail in Fig. 5, the shaft 24 is locked in any desired position by the rotation of a lock nut hand wheel 28. The locking effect is produced by rotating the lock nut hand wheel on the threaded end of the shaft 24 until the inner face of the wheel 28 binds against the bearing 26.

Figure 5:
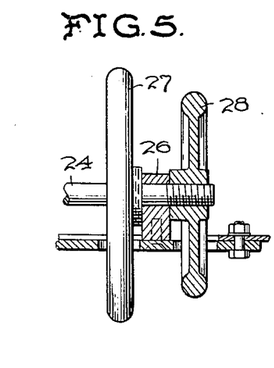
Fig. 5 is a fragmentary plan view partly in section of the locking means of the regulating mechanism for the bag dump hopper.

A visual indicator 29 positioned on the end of shaft 20 and indicates by means of markings 30 the exact position of the baffle plate 19 with respect to the two conveying surfaces 8 and 9. The baffle plate 19 is moved to any desired position with respect to the two conveying surfaces by the rotation of the hand wheel 27, the worm gear 23, and the gear 21 mounted on the baffle plate shaft 20. After the baffle plate is in the desired position, as indicated by the indicator 29 and the markings 30, this position is maintained during the operation of the apparatus by rotating the lock nut hand wheel 28 until it is secure against the bearing 26 to prevent the further rotation of the shaft 24.

It is seen in Fig. 2 that if the baffle plate 19 is positioned as shown no material will flow from the conveying surface 8 into the discharge opening 16, but will flow in an unrestricted manner from the conveying surface 9. If the baffle plate 19 is positioned as at 19′ no material will flow from the conveying surface 9 into the discharge opening 16, but will flow in an uninterrupted manner from the conveying surface 8. If the baffle plate is positioned as at 19″, then an equal amount of material will flow from each of the conveying surfaces onto the discharge opening if the material on each conveying surface is of the same type, or have the same conveying properties. From this arrangement it is seen that any rate of proportioning can be obtained by the proper positioning of the baffle plate 19, and that two materials having different conveying characteristics can be blended into the discharge opening in equal or varying amounts by the proper setting of the baffle plate 19 to accommodate the flow rate of the respective materials.

Figure 6:
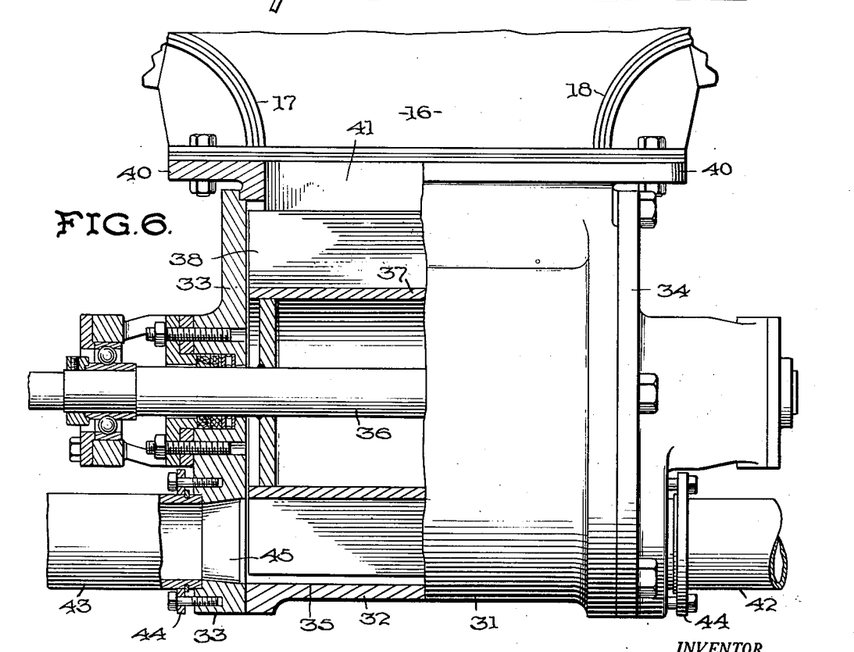
Fig. 6 is a fragmentary elevation partly in section of the rotary feeder for the bag dump hopper.

A rotary feeder 31 is positioned opposite and beneath the discharge opening 16 adjacent the ends of the gas permeable members 8 and 9. The feeder comprises a casing 32 having end walls 33 and 34 defining a cylindrical chamber 35. Mounted on a horizontally disposed shaft 36 within the casing is a rotor 37 having a plurality of blades 38 extending radially outwardly from the rotor toward the inner wall of the chamber 35. The distances between the outer ends of the blades and the wall of the casing defining the chamber are so small that no substantial amount of air or material can pass between the inner wall of the chamber and the outer ends of the blades. The rotor, the spaced blades, and the walls of the chamber, define a plurality of pockets 39, for receiving finely divided aerated material from the conveying surfaces 8 and 9 and delivering it to a pneumatic line as hereinafter described. The casing 32 of the rotary feeder has horizontal flanges 40 at its upper side which are bolted to the bottom of the bag dump hopper about the discharge port 16. The upper portion of the casing has a passageway 41 through which material passing through the discharge port 16 falls by gravity into the several pockets 39 as the rotor rotates.

An air supply conduit 42, connected to a conventional blower or compressor 57 driven by a motor 58 provides air as a conveying medium into the rotary feeder, and a second conduit 43 is provided to carry the material-air mixture from the rotary feeder. Coupling means 44 are provided for each of the conduits 42 and 43. A pair of aligned passages 45 extend through the lower portions of the end walls 33 and 34, respectively, of the rotary feeder and register with the several pockets 39 as the rotor rotates. Preferably, the inner ends of the passages 45 are at least as large in cross section in all dimensions as the cross section of the pockets. The outer ends of the passages 45 are of different shape and cross section from the inner ends of the passages, and are of a shape appropriate for connection to the conduits 42 and 43, preferably of circular cross section.

The pressure to be supplied to the passages 45 of the rotary feeder is determined by the material-to-air ratio which is desired, and by the distance the material must be conveyed from the bag dump hopper.

Any conventional drive, indicated at 46, is provided for imparting rotation to the shaft 36 of the rotary feeder to cause rotation of the rotor during the discharge operation. The rotational speed of the rotor will be determined by the rate of feed of material into the rotary feeder and from the rotary feeder into the conduit 43 by the material-to-air ratio desired, by the lateral dimensions of the gas permeable members 8 and 9, and by the pressure at which gas is admitted to the plenum chambers 10 and 11.

After the material in the several pockets 39 is successively discharged through passage 45 into the conduit 43, air under pressure is trapped in the pockets as the rotor continues its cycle from the passage 45 around to the passageway 41 and the discharge port 16. This entrapped air is released into the discharge port 16 as the blade 38 passes the edge 47 of the passageway 41 with a geysering effect being produced in the material as the air escapes up through the discharge port 16.

Impact plates 48 and 49 are positioned directly above the discharge port 16 and extend from the sloping side wall 6 to the sloping side wall 7. The impact plates are held in position by means of overlapping flanges 50 and 51 positioned around a shaft 52. The impact plates 48 and 49 positioned directly above the discharge port 16 serve as a means for dissipating the material blown upwardly by the geysering effect created by the entrapped air in the pockets 39 as it is released into the discharge port. These plates not only protect the operator of the bag dump hopper as he is dumping material into the opening 53 of the hopper, but also reduces the amount of dust in the hood area 54.

The material dumped into the hopper is usually packaged in bags. A guard grid 55 is provided to prevent one of these bags from entering the rotary feeder 31 in the event one is accidentally dropped by the operator during the filling operation of the bag dump hopper.

A certain degree of dusting is inherent in an apparatus of this nature; therefore, the hood area 54 is provided with a venting means 56 connected to the dust collection system.

In the operation of the bag dump hopper the baffle plate 19 is placed in the desired position by the rotation of the hand wheel 27, and is then locked in this position by the lock nut wheel 28. The position of the baffle plate 19 will be determined by the desired blend ratio of the materials placed in the bag dump hopper with respect to their aerated flow characteristics. If an equal amount of each material is desired and the aerated flow characteristics of the materials are the same, the baffle plate 19 will be vertical, thereby dividing the discharge port 16 into equal areas. This vertical position of the baffle plate will likewise be selected if no blending is desired and only one type of material is being fed into the hopper. If other than an equal ratio of materials is desired, the baffle plate will be moved to reduce the effective area of the discharge port 16 adjacent the side of the bag dump hopper into which the lesser amount of material is fed.

When the material is to be discharged from the bag dump hopper, the means 14 and 15 for supplying gas under pressure to the plenum chambers 10 and 11 are actuated, and gas from such means flows into the plenum chambers, through the gas permeable members 8 and 9, and into the material on the upper material conveying surfaces. The gas aerates the material above the upper material conveying surfaces of the gas permeable members causing the material to flow downwardly along the gas permeable member by gravity into the discharge port 16 in a regulated manner determined by the position of the baffle plate 19. As the material directly above the gas permeable members flows into the discharge port, other material in the hopper flows downwardly along the sloping side walls 6 and 7 onto the material conveying surfaces of the gas permeable members. Material is added through the opening 53 to maintain a sufficient level in the hopper for proper operation.

The driving means 46 for imparting rotation to the rotor 37 of the rotary feeder 31 is actuated at the same time the gas means 14 and 15 are actuated. The rotation of the rotor exposes each of the pockets 39 successively to the feed passage 41 so that each pocket as it rotates past the passage receives its load of aerated material from the discharge port 16. The rotation of the pockets carries aerated material therein downwardly until the pockets register with the passages 45 of the rotary feeder. Gas under pressure supplied the rotary feeder through the conduit 42 blows the material in the pocket registering with passages 45 out of the pocket into the conveying conduit 43 wherein the material and gas mixture enters the conveying system.

In the event that different materials are placed in the bag dump hopper for blending, these aerated materials enter the rotary feeder from their respective material conveying surfaces in the same manner as described above. The blending of the material begins as they enter the discharge port 16 in an aerated state and pass downwardly into the passage 41 of the rotary feeder. A substantial amount of the blending is accomplished as the two materials are blown through the passage 45 into the conveying duct 43, and the process is completed as the materials are conveyed through the conduit 43 of the conveying system.

It is seen from the above that a bag dump hopper of this design has an additional cooperative function in that it delivers material into the conveying system in a uniform free aerated stream of constant unit weight and density. The continuously uniform free aerated discharge of material allows a higher material saturation of the air stream to be obtained in the conveyor and results in a decrease in the amount of power needed to entrain the material in the air stream as compared to feeding apparatus that delivers the material to the pneumatic conveyor in a compact inert mass. It has been found that use of apparatus designed in accordance with the present invention makes possible an increase in capacity of a pneumatic conveyor of as much as 50% over that possible with previous types of feeders, without any increase in power consumption by the pneumatic conveyor, or if desired, results in reducing the conduit size of the pneumatic conveyor for the same carrying capacity and power consumption as compared to a pneumatic conveyor using the conventional feeding means.

The air-material mixture in conduit 43 is conveyed to an air-material separator 59 of the conventional cyclone type.

The air-material separator 59 is positioned above a conventional sifter 60 and is connected thereto by means of a flexible connection 61 provided with a rotary air lock 62 for preventing any air entering the sifter 60 and hampering the sifting function. The material separated from the air in the separator 59 is discharged from the separator through the rotary air lock through the flexible connection 61 into the sifter 60.

The material in the sifter is divided into a coarse fraction and a fine fraction. The coarse fraction is discharged into a collector 63 through a flexible connection 64 where it is later manually removed from the system. The fine fraction is discharged into a collector hopper 65 through a flexible connection 66 to provide a head of material over a rotary feeder 67. The rotary feeder 67 is of the same design and operation as set forth for the rotary feeder 31, and will not again be described in detail. The collection hopper 65 is vented to the dust collection system, to be described later, through a conduit 68 to prevent any of the air exhausted from the rotary feeder 67 from entering the sifter 60. In the event any air should enter the sifter a vent 69 is provided and connected to the conduit 68 by a conduit 70.

The rotary feeder 67 is provided with an air supply conduit 71 connected to the air discharge outlet of the air-material separator 59, and utilizes the air separated from the material in the separator 59 for conveying the material from the rotary feeder 67. A separate source of air may be provided for the rotary feeder 67, but it is obvious that the unique arrangement of utilizing the air discharged from the air-material separator not only reduces the power consumption for the operation of the conveying system, but also decreases the initial cost of the installation. A conduit 72 is provided to convey the air-material mixture from the rotary feeder 67 to an air-material separator 73 of the conventional cyclone type.

The air-material separator 73 is positioned above a material receiver 74. The material separated from the air in the separator 73 is discharged into the material receiver 74 where it forms a head of material above a rotary feeder 75. Rotary feeder 75 is of the same design and operation as set forth for the rotary feeder 31, and will not again be described in detail.

The rotary feeder 75 is provided with an air supply conduit 78 from any convenient source of air supply which may be a separate air compressor, air compressor 57, or air supplied from the air discharge outlet of one of the air-material separators. Conduit 79 is connected to the discharge outlet of the rotary feeder 75 and used as a means of conveying the material discharged into the rotary feeder from the material receiver 74 to a distribution valve 80. to be described later.

A conduit 81 extends from the distribution valve 80 to an air-material separator 82 of the conventional cyclone type, positioned above and discharging into a conventional scale hopper 83 of the four point suspension type provided with a balance beam 84. A by-pass conduit 85 extends from the distribution valve 80 to the air-material separator 73 positioned above the material receiver 74.

Figure 7:
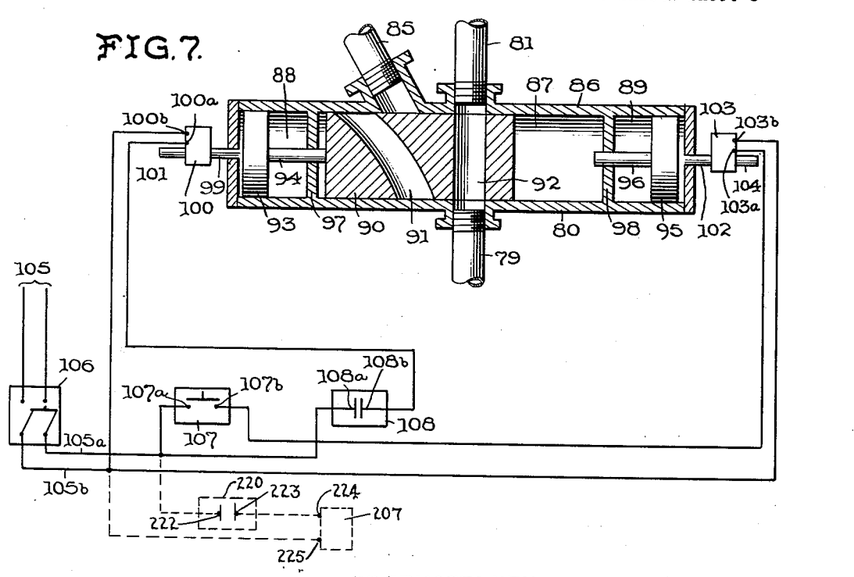
Fig. 7 is a detail diagram of the circuit for operating the distribution valve of the conveying system.

As disclosed in Fig. 7, it is seen that the distribution valve 80 comprises a housing 86 partitioned into compartments by two inner walls 97 and 98 forming a valve chamber 87 and two air chambers 88 and 89 within the valve body structure. A valve plug 90, provided with two passageways 91 and 92, is positioned inside the valve chamber and adapted to slide longitudinally therein. An air piston 93 having a valve plug push rod 94 extending through the wall 97 into the valve chamber is positioned inside the air chamber 88, and in a like manner an air piston 95 having a valve plug push rod 96 extending through the wall 98 into the valve chamber is positioned inside the air chamber 89. Air to actuate the air piston 93 is supplied to the air chamber 88 through a conduit 99 and is controlled by a conventional three-way two position solenoid actuated control valve 100. Air is supplied to the solenoid valve 100 by means of conduit 101. In a like manner, air to actuate the air piston 95 is supplied to the air chamber 89 through a conduit 102 and is controlled by a conventional three-way two position solenoid valve 103. Air is supplied to the solenoid valve 103 by means of a conduit 104.

Figure 8:
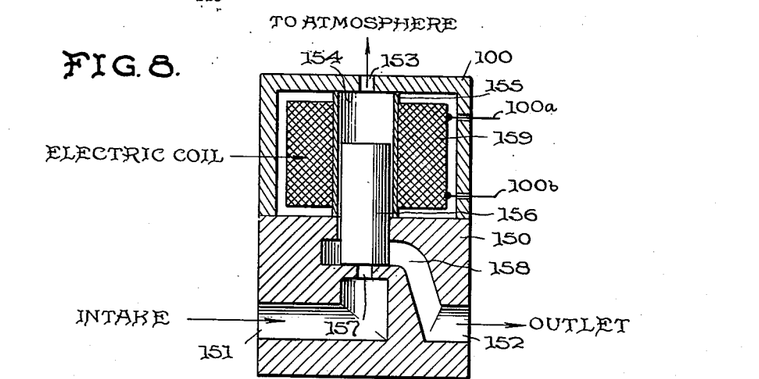
Fig. 8 is a schematic diagram of the solenoid valve of the distribution valve for the conveying system.

The three-way two position solenoid valve 100, as disclosed schematically in Fig. 8, comprises a body 150 having an air inlet port 151 and an air outlet port 152. A valve chamber 154 formed by a cylindrical wall 155 is provided with a plunger 156. The air inlet port 151 communicates with the valve chamber 154 through a valve port 157. The air outlet port 152 communicates with the valve chamber 154 through a valve port 158. The valve chamber exhausts to atmosphere through an exhaust port 153. An electric field coil 159 is formed around the outside of the cylindrical wall 154 forming the valve chamber and is provided with circuit connections 100a and 100b.

In the operation of the solenoid valve 100 the plunger 156 closes the air inlet valve port 157 in the normal position of the plunger, and is held in this position by the force of gravity. When the circuit connections 100a and 100b of the field coil 159 are energized, the magnetic effect produced by the flow of electric current lifts the plunger 156 to open the valve port 157 and close the exhaust port 153. With the plunger in this position the valve port 158 is also open and in communication with the valve port 157 through the valve chamber 154. With valve ports 157 and 158 in communication air flows from the inlet port 151 through the outlet port 152 into the air chamber 88 of the distribution valve 80 through the conduit 99. When the field coil 159 is de-energized, the plunger 156 falls to its original position closing the valve port 157. With the plunger in this position, the outlet valve port 158 is in communication with the exhaust port 153 through the valve chamber 154, thereby permitting the air in the air chamber 88 of the distribution valve 80 to exhaust to atmosphere. The design and operation of the solenoid valve 103 is the same as has been described for the solenoid valve 100.

The electrical circuit for this flour weighing and conveying system is represented schematically and in somewhat simplified form in Fig. 7. A source of A.-C. voltage 105 is furnished the circuit through a disconnect switch 106 having lead-off circuits 105a and 105b. A scale push button switch 107 has one terminal 107a connected to the circuit 105a and the other terminal 107b connected to one field terminal 103a of the solenoid switch 103. A scale beam cut-off switch 108 has one terminal 108a connected to the circuit 105a and the other terminal 108b connected to one field terminal 100a of the solenoid switch 100. The second field terminal 103b of the solenoid switch 103 is connected to the circuit 105b and the second field terminal 100b of the solenoid switch 100 is connected to the circuit 105b.

The conduit 79 conveying material from the rotary feeder 75 to the distribution valve 80 communicates with the conduit 81 through the passageway 92 of the valve plug 90. The valve plug 90 is placed in this position by closing the scale push button switch 107 and energizing the field coil of the solenoid valve 103, thereby admitting air into the air chamber 89. As air is admitted into the air chamber 89 through the conduit 102, the air piston 95 moves to the left, contacting the valve plug 90 by means of valve plug push rod 96, and moves the valve plug to the left until conduits 79 and 81 communicate through the passageway 92 of the valve plug. This action is instantaneous. When the scale push button switch 107 is again opened, de-energizing the field of the solenoid valve 103, the air in the air chamber 89 is exhausted to atmosphere.

The conduit 79 conveying material from the rotary feeder 75 to the distribution valve 80 communicates with the by-pass conduit 85 through the passageway 91 of the valve plug 90. The valve plug is placed in this position by the closing of the scale beam cut-off switch 108 to energize the field coil of the solenoid valve 100, thereby admitting air into the air chamber 88. As the air is admitted into the air chamber 88 through the conduit 99, the air piston 93 moves to the right, contacting the valve plug 90 by means of valve plug push rod 94, and moves the valve plug to the right until the conduits 79 and 85 communicate through the passageway 91. When the scale beam cut-off switch 108 is again opened, de-energizing the field of the solenoid valve 100, the air in the air chamber 88 is exhausted to atmosphere.

In the operation of the scale hopper 83, the operator sets the desired weight of material to be conveyed into the scale hopper through the conduit 79 on the scale hopper balance beam 84. The scale push button switch 107 is closed to connect the conduit 79 to the conduit 81 through the distribution valve 80, and the material in the conduit 75 is conveyed from the rotary feeder 75 to the scale hopper 83. When the desired amount of material has been conveyed to the scale hopper, the scale hopper balance beam 84 is balanced at the zero position and closes the contact points of the scale beam cut-off switch 108. The closing of the scale beam cut-off switch actuates the distribution valve 80 to disconnect the conduit 79 from the conduit 81 by instantaneously moving the valve plug to the right, and connects the conduit 79 to the by-pass conduit 85, thereby recirculating the material being conveyed back to the material receiver 74 through the air-material separator 73. The scale beam cut-off switch remains closed until the material has been removed from the scale hopper to prevent additional material from being added to the scale hopper by the accidental closing of the scale push button switch. If it is desired, the scale push button switch may be interlocked with the starter switches of the various revolver feeders and blowers of the system to provide an automatically operated system controlled from one operating position. It may also be desirable to interlock the electrical control of the driving means for the rotary feeder 75 with the scale beam cut-off switch 108 to stop the rotation of the rotary feeder when the cut-off switch is closed. In this event, there should be provided an interlocked time-delay switch for the blower furnishing air to the conduit 78 to permit cleaning out of the material in the exposed pocket of the rotary feeder 75 and the conduit 79 before the blower is stopped.

The material in the scale hopper is removed by opening the valve 110 and discharging the material into a mixer 111, or any other suitable apparatus for further processing of the material.

A fan type centrifugal separator, or dynamic precipitator, 112 of the conventional type is positioned above the material receiver 74 and is provided with a header 113 connected to the suction side of the separator. A conduit 114, having a flow control valve 115, extends from the air discharge outlet of the air-material separator 82 of the scale hopper bin 83 to the header 113 of the separator 112. A conduit 116, having a flow control valve 117, extends from the air discharge outlet of the air-material separator 73 of the material receiver 74 to the header 113. Conduit 68, having a flow control valve 118, connects to the header 113 and provides communication from the sifter 60 and the hopper 65 to the separator 112. A conduit 119 extends from the air discharge outlet of the separator 112 to a filter box 120. A conduit 121 connects the material outlet of the separator 112 to a material inlet port 122 in the material receiver 74. A bleeder port 123 provided with filter pads connects into the conduit 114 to admit atmospheric air into the conduit 114. The resistance to the flow of air through the filter pads creates a greater pressure differential than that normal in the flow of air from the separator 82 to the header 113. In a like manner a bleeder port 124 is provided for the conduit 116 and a bleeder port 125 is provided for the conduit 68.

In the event that the supply of air is reduced in any one of the conduits 114, 116 or 68, thereby increasing the vacuum pull in the conduit, atmospheric air will enter the respective bleeder port and provide a normal flow of air through the conduit.

The rotation of the fan in the separator 112 creates a reduced pressure in the header 113. Any of the pulverulent material in the form of dust not separated in the separators 73 and 82, and in the dust laden air from the hopper 65 and the sifter 60, is pulled into the separator 112 through their respective conduits by the reduced pressure in the header 113. The flow control means 115, 117 and 118 regulate the back pressure in the respective conduits to compensate for the different lengths of the conduits connected to the header 113, thereby preventing a short circuiting of the incoming air attempting to seek the path of least resistance through the shortest length conduit.

Material separated from the dust laden air entering the separator 112 is discharged into the material receiver 74 through the inlet port 122, and the exhaust air from the separator 112 is conveyed to the filter box 120 through the conduit 119.

A conduit 126 connects the venting means 56 of the bag dump hopper 1 to the suction inlet of a blower 127. The discharge outlet 128 of the blower 127 discharges the dust laden air conveyed from the hood of the bag dump hopper 1 into the filter box 120.

The air introduced into the filter box 120 through the blower outlet 128 and the conduit 119 passes through a series of dust filters and is then discharged to atmosphere in a dust free state.

Figure 9:
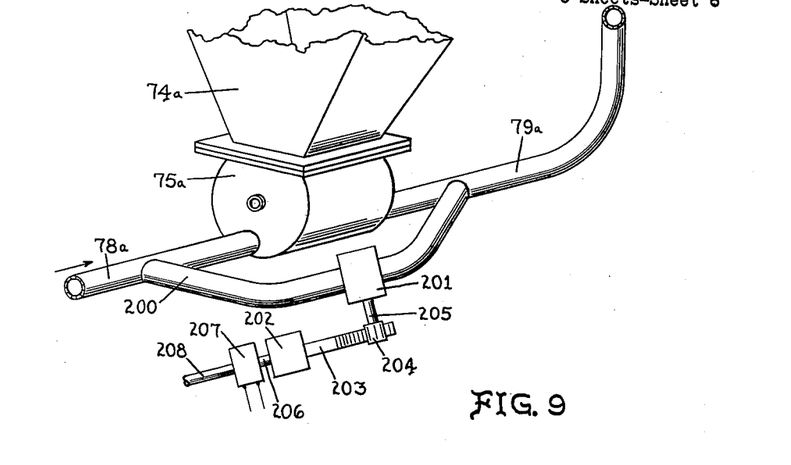
Fig. 9 is a perspective view of a modified form of a portion of the system.
Figure 10:
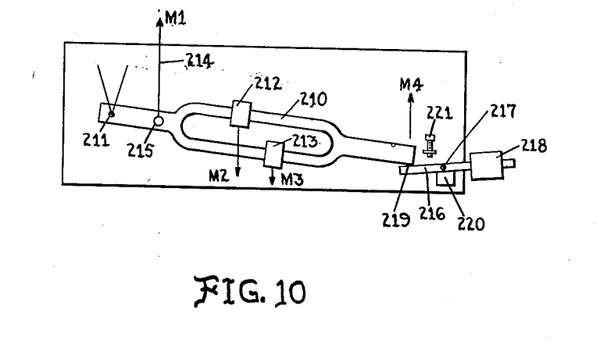
Fig. 10 is a schematic view of the scale hopper beam in the modified form of a portion of the system.

In the modified form of apparatus illustrated in Fig. 9 and Fig. 10, the rotary feeder 75a of the material receiver 74a is provided with an air supply conduit 78a and an air-material outlet conduit 79a. The air-material conduit 79a conveys the material to a distribution valve as was described for the system in Fig. 1. The rotary feeder 75a is of the same design and operation as set forth for the rotary feeder 31, and will not again be described in detail.

An air-pass conduit 200 extends from the air supply conduit 78a to the air-material conduit 79a around the rotary feeder 75a. A butterfly valve 201 of the conventional type, positioned in the conduit 200, is used as a means for regulating the flow of air through the conduit 200. A single acting-spring return air motor 202 actuates the butterfly valve through a rack 203 connected to the piston of the air motor mating with a gear 204 of the butterfly valve damper shaft 205. Air for operating the air motor 202 is supplied by conduit 206 connecting the air motor to a three-way two position solenoid valve 207. The solenoid valve 207, supplied with air by conduit 208, controls the flow of operating air to and from the air motor. The solenoid valve 207 is of the same design and operation as set forth for the solenoid valve 100, and will not again be described in detail.

A modified form of the conventional scale hopper balance beam is disclosed schematically in Fig. 10.

The conventional balance beam consists primarily of a calibrated beam 210 pivoted at point 211 and having sliding weights 212 and 213 movable along the beam. A link 214, connected at point 215 of the beam 210, extends from the beam to the linkage mechanism of the scale hopper. The principle of operation is the balancing of the effective moments about the point 211. To balance the beam 210 the moment $M_1$ equals to the combined moments $M_2$ and $M_3$. The moment $M_1$ is determined by the weight of material placed in the scale hopper. The moments $M_2$ and $M_3$ are determined by the preset positions of the weights 212 and 213 according to the final desired weight of material in the scale hopper. As the amount of material in the scale hopper approaches the desired weight, i. e., $M_1$ approaches $M_2$ plus $M_3$ the scale beam will start moving to the zero, or horizontal, position. When the scale beam reaches the zero position, the scale beam cut-off switch is closed actuating the distribution valve to divert the material stream from the scale hopper.

This method of operation is effective when the material conveying duct from the distributing valve to the scale hopper is relatively short, but presents disadvantages in accurate weighing when any substantial length of conduit is necessary. The action of the distribution valve is instantaneous in response to the closing of the scale beam cut-off switch, but there is a quantity of material being conveyed to the scale hopper that has passed through the distributing valve at the instant the material stream is diverted, and flows into the scale hopper as an additional amount in excess of the amount set on the scale beam by weights 212 and 213. It is possible to improve this situation to a degree by either setting a smaller indicated amount of the desired material on the scale beam or closing the scale beam cut-off switch prior to the zero position of the scale beam.

All three of the above methods have difficulty in accurately regulating the amount of material into the scale hopper because the material is being conveyed at a high velocity in a stream having the most efficient air-material ratio for the design of the conveying system.

An improved method of accurate weighing is accomplished by providing the conventional scale beam with a beam 216 pivoted at point 217 and provided with a slidable weight 218 movable along one end of its length. The opposite end of the beam 216 is positioned against the scale beam 210 at a point 219. A mercury switch 220 is connected to the beam 216 and is actuated the instant the beam moves in a clockwise direction. The clockwise rotation of the beam 216 is stopped by an adjustable set screw 221.

The elecrtical circuit connecting the mercury switch to the solenoid valve 207 of the air motor 202 is shown in dotted lines in Fig. 7 as it would be incorporated into the electrical circuit for the complete system. The mercury switch 220 has one terminal 222 connected to the circuit 105a and the other terminal 223 connected to the field coil terminal 224 of the solenoid valve 207. The second field coil terminal 225 of the solenoid valve 207 is connected to the circuit 105b.

In the operation of the modified form of the invention the weights 212 and 213 of the scale beam 210 are adjusted to give the desired amount of material in the scale hopper. The complete system, as described for Fig. 1, is placed in operation to convey the material into the scale hopper.

The weight 218 on the beam 216 produces a clockwise moment around the point 217. This moment acts at point 219 on the beam 210 to produce moment $M_4$ assisting $M_1$ against $M_2$ and $M_3$. The weight 218 can be adjusted to produce any desired moment, but is usually set to produce a moment equivalent to about thirty pounds of material in the scale hopper. With the conventional scale hopper beam the beam will start to swing from its dead position to its horizontal position as the material in the scale hopper approaches the desired amount, i. e., as the value of $M_1$ approaches the value of $M_2$ plus $M_3$. With the assistance of the moment $M_4$ produced by the weight 218 the movement of the beam 210 to the horizontal position will start sooner and will assist the moment $M_1$ to overcome the moments $M_2$ and $M_3$ until the beam 216 stops against set screw 221, from that position on to the horizontal position the beam 210 is acted on only by the moments $M_1$, $M_2$ and $M_3$ in the conventional manner.

The clockwise movement of the beam 216 closes the contact points of the mercury switch 220, completing the electrical circuit to the field coil of the solenoid valve 207. thereby admitting air into the air motor 202 from the air supply line 208 through the conduit 206. The piston of the air motor moves the rack 203 forward rotating the gear 204 to open the butterfly valve 201.

Prior to opening the butterfly valve 201, all of the conveying air in the conduit 78a had been flowing through the rotary feeder 75a entraining the material and discharging to the scale hopper through the conduit 79a, as was described for Fig. 1. When the butterfly valve 201 opens part of the air in the conduit 78a will by-pass the rotary feeder 75a and re-enter the system free of material through the conduit 79a where it is mixed with the air and material discharging from the rotary feeder 75a. The entry of the air from the conduit 200 into the conduit 79a will greatly increase the air to material ratio and thereby reduce the amount of material being conveyed per cubic foot of conveying air. The air to material ratio can be adjusted to any desired amount by the opening of the butterfly valve and controlling the resulting amount of air flowing therethrough.

When the moment $M_1$ equals the moments $M_2$ and $M_3$, the scale beam is in a horizontal position and closes the contact points of the scale beam cut-off switch. The closing of the scale beam cut-off switch actuates the distribution valve to divert the material being conveyed from the scale hopper. The material that has passed through the distribution valve after the scale beam cut-off switch closes, but has not reached the scale hopper, is an extremely small amount due to the lean mixture of the air-material conveying stream, and this amount of material will not affect the accuracy in obtaining the desired amount of material in the scale hopper.

I claim:

1. A pulverulent material handling system comprising a supply hopper, means for withdrawing pulverulent material from the supply hopper, a source of air under pressure, means for entraining the withdrawn material in a stream of air from said source, a first air-material separator, means for conducting said air stream to the first air-material separator, a material classifier, means for conducting material separated from the air stream in the first air-material separator to the material classifier, said material classifier dividing the material supplied thereto into a fine fraction and a coarse fraction, means for withdrawing the fine fraction from the material classifier, a second source of air under pressure, means for entraining the withdrawn fine fraction of material into a stream of air from the said second source, a second air-material separator, means for conducting said second air stream to the second air-material separator, a material receiver, means for conducting material separated from the second air stream in the second air-material separator to the material receiver, means for withdrawing the material from the material receiver, a third source of air under pressure, means for entraining the withdrawn material from the material receiver in a stream of air from the said third source, a distribution valve, means for conducting material withdrawn from the material receiver and entrained in the said third air stream to the distribution valve, a third air-material separator, conduit means extending from the distribution valve to the third air-material separator, a scale hopper bin, means within said scale hopper bin for measuring predetermined amounts of material, means for conducting material from the third air-material separator to the scale hopper bin, a receiver, means for conducting measured amounts of material from the scale hopper bin to the receiver, and means operable upon the discharge of a predetermined amount of material from said third air-material separator into said scale hopper bin for selectively operating said distributing valve to interrupt the flow of material from the distributing valve to the third air-material separator.

2. A pulverulent material handling system comprising a supply hopper, means for withdrawing pulverulent material from the supply hopper, a source of air under pressure, means for entraining the withdrawn material in a stream of air from said source, a first air-material separator, means for conducting said air stream to the first air-material separator, a material classifier, means for conducting material separated from the air stream in the first air-material separator to the material classifier, said material classifier dividing the material supplied thereto into a fine fraction and a coarse fraction, means for withdrawing the fine fraction from the material classifier, a second source of air under pressure, means for entraining the withdrawn fine fraction of material in a stream of air from the said second source, a second air-material separator, means for conducting said second air stream to the second air-material separator, a material receiver, means for conducting material separated from the second air stream in the second air-material separator to the material receiver, means for withdrawing the material from the material receiver, a third source of air under pressure, means for entraining the withdrawn material from the material receiver in a stream of air from the said third source, a distribution valve, means for conducting material withdrawn from the material receiver and entrained in said third air stream to the distribution valve, a third air-material separator, conduit means extending from the distribution valve to the third air-material separator, conduit means extending from the distribution valve to the second air-material separator, a scale hopper bin, means within the scale hopper bin for measuring predetermined amounts of material, means for conducting material from the third air-material separator to the scale hopper bin, a receiver, means for conducting measured amounts of material from the scale hopper bin to the receiver, and means operable upon the discharge of a predetermined amount of material from the third air-material separator into the scale hopper bin for selectively operating the distribution valve to place the air stream from the discharge of the material receiver in communication with the conduit means extending from the distribution valve to the second air-material separator.

3. A pulverulent material handling system comprising a supply hopper, means for withdrawing pulverulent material from the supply hopper, a source of air under pressure, means for entraining the withdrawn material in a stream of air from said source, a first air-material separator, means for conducting said air stream to the first air-material separator, a material classifier, means for conducting material separated from the air stream in the first air-material separator to the material classifier, said material classifier dividing the material supplied thereto into a fine fraction and a coarse fraction, means for withdrawing the fine fraction from the material classifier, a second source of air under pressure, means for entraining the withdrawn fine fraction of material in a stream of air from the said second source, a second air-material separator, means for conducting said second air stream to the second air-material separator, a material receiver, means for conducting material separated from the second air stream in the second air-material separator to the material receiver, means for withdrawing the material from the material receiver, a third source of air under pressure, means for entraining the withdrawn material from the material receiver in a stream of air from the said third source, a distribution valve, means for conducting material withdrawn from the material receiver and entrained in the said third air stream to the distribution valve, a third air-material separator, conduit means extending from the distribution valve to the third air-material separator, a scale hopper bin, means within said scale hopper bin for measuring predetermined amounts of material, means for conducting material from the third air-material separator to the scale hopper bin, a receiver, means for conducting measured amounts of material from the scale hopper bin to the receiver, a fourth air-material separator, means for conducting air separated from the material in the second air-material separator to the said fourth air-material separator, means for conducting air separated from the material in the third air-material separator to the said fourth air-material separator, means for conducting material separated in the fourth air-material separator to the material receiver, and means operable upon the discharge of a predetermined amount of material from the third air-material separator into said scale hopper bin for selectively operating said distribution valve to interrupt the flow of material from the distribution valve to the third air-material separator.

4. A pulverulent material handling system comprising a supply hopper, means for withdrawing pulverulent material from the supply hopper, a source of air under pressure, means for entraining the withdrawn material in a stream of air from said source, a first air-material separator, means for conducting said air stream to the first air-material separator, a material classifier, means for conducting material separated from the air stream in the first air-material separator to the material classifier, said material classifier dividing the material supplied thereto into a fine fraction and a coarse fraction, means for withdrawing the fine fraction from the material classifier, a second source of air under pressure, means for entraining the withdrawn fine fraction of material in a stream of air from the said second source, a second air-material separator, means for conducting the second air stream to the second air-material separator, a material receiver, means for conducting material separated from the second air stream in the second air-material separator to the material receiver, means for withdrawing the material from the material receiver, a third source of air under pressure, means for entraining the withdrawn material from the material receiver in a stream of air from the said third source, a distribution valve, means for conducting material withdrawn from the material receiver and entrained in the third air stream to the distribution valve, a third air-material separator, conduit means extending from the distribution valve to the third air-material separator, conduit means extending from the distribution valve to the second air-material separator, a scale hopper bin, means within said scale hopper bin for measuring predetermined amounts of material, means for conducting material from the third air-material separator to the scale hopper bin, a receiver, means for conducting measured amounts of material from the scale hopper bin to the receiver, a fourth air-material separator, means for conducting air separated from the material in the second air-material separator to the fourth air-material separator, means for conducting air separated from the material in the third air-material separator to the fourth air-material separator, means for conducting material separated in the fourth air-material separator to the material receiver, and means operable upon the discharge of a predetermined amount of material from the third air-material separator into the scale hopper bin for selectively operating the distribution valve to place the air stream from the discharge of the material receiver in communication with the conduit means extending from the distribution valve to the second air-material separator.

5. A pulverulent material handling system comprising a supply hopper, means for withdrawing pulverulent material from the supply hopper, a source of air under pressure, means for entraining the withdrawn material in a stream of air from said source, a first air-material separator, means for conducting said air stream to the first air-material separator, a material classifier, means for conducting material separated from the air stream in the first air-material separator to the material classifier, said material classifier dividing the material supplied thereto into a fine fraction and a coarse fraction, means for withdrawing the fine fraction from the material classifier, said material classifier withdrawing means being provided with an air vent, a second source of air under pressure, means for entraining the withdrawn fine fraction of material in a stream of air from the said second source, a second air-material separator, means for conducting the second air stream to the second air-material separator, a material receiver, means for conducting material separated from the second air stream in the second air-material separator to the material receiver, means for withdrawing the material from the material receiver, a third source of air under pressure, means for entraining the withdrawn material from the material receiver in a stream of air from the said third source, a distribution valve, means for conducting material withdrawn from the material receiver and entrained in the third air stream to the distribution valve, a third air-material separator, conduit means extending from the distribution valve to the third air-material separator, conduit means extending from the distribution valve to the second air-material separator, a scale hopper bin, means within the scale hopper bin for measuring predetermined amounts of material, means for conducting material from the third air-material separator to the scale hopper bin, a receiver, means for conducting measured amounts of material from the scale hopper bin to the receiver, a fourth air-material separator, means for conducting air separated from the material in the second air-material separator to the fourth air-material separator, means for conducting air separated from the material in the third air-material separator to the fourth air-material separator, means for conducting air from the air vent of the material classifier withdrawing means to the fourth air-material separator, means for conducting material separated in the fourth air-material separator to the material receiver, an air-material filter, means for conducting air separated from the pulverulent material in the fourth air-material separator to the air-material filter, means for withdrawing air from the upper portion of the supply hopper and conducting it to the air-material filter, and means operable upon the discharge of a predetermined amount of material from the third air-material separator into the scale hopper bin for selectively operating said distribution valve to place the air stream of the discharge from the material receiver in communication with the conduit means extending from the distribution valve to the second air-material separator.

6. A pulverulent material handling system comprising a supply hopper, means for withdrawing pulvulent material from the supply hopper, a source of air under pressure, means for entraining the withdrawn material in a stream of air from said source, a first air-material separator, means for conducting said air stream to the first air-material separator, a material separator, means for conducting material separated from the air stream in the first air-material separator to the material separator, said material separator dividing the material supplied thereto into a fine fraction and a coarse fraction, means for withdrawing the fine fraction from the material separator, a second source of air under pressure, said second source of air being the air separated from the material in the first air-material separator, means for entraining the withdrawn fine fraction of material in a stream of air from the said second source, a second air-material separator, means for conducting said second air stream to the second air-material separator, a material receiver, means for conducting material separated from the second air stream in the second air-material separator to the material receiver, means for withdrawing the material from the material receiver, a third source of air under pressure, means for entraining the withdrawn material from the material receiver into a stream of air from the said third source, a distribution valve, means for conducting material withdrawn from the material receiver and entrained in the said third air stream to the distribution valve, a third air-material separator, conduit means extending from the distribution valve to the third air-material separator, a scale hopper bin, means within said scale hopper bin for measuring predetermined amounts of material, means for conducting material from the third air-material separator to the scale hopper bin, a receiver, means for conducting measured amounts of material from the scale hopper bin to the receiver, and means operable upon the discharge of a predetermined amount of material from said third air-material separator into said scale hopper bin for selectively operating said distribution valve to interrupt the flow of material from the distribution valve to the third air-material separator.

7. A pulverulent material handling system comprising a supply hopper, means for withdrawing pulverulent material from the supply hopper, a source of air under pressure, means for entraining the withdrawn material in a stream of air from said source, a first air-material separator, means for conducting said air stream to the first air-material separator, a material separator, means for conducting material separated from the air stream in the first air-material separator to the material separator, said material separator dividing the material supplied thereto into a fine fraction and a coarse fraction, means for withdrawing the fine fraction from the material separator, a second source of air under pressure, said second source of air being the air separated from the material in the first air-material separator, means for entraining the withdrawn fine fraction of material in a stream of air from the said second source, a second air-material separator, means for conducting said second air stream to the second air-material separator, a material receiver, means for conducting material separated from the second air stream in the second air-material separator to the material receiver, means for withdrawing the material from the material receiver, a third source of air under pressure, means for entraining the withdrawn material from the material receiver into a stream of air from the said third source, a distribution valve, means for conducting material withdrawn from the material receiver and entrained in said third air stream to the distribution valve, a third air-material separator, conduit means extending from the distribution valve to the third air-material separator, conduit means extending from the distribution valve to the second air-material separator, a scale hopper bin, means within said hopper bin for measuring predetermined amounts of material, means for conducting material from the third air-material separator to the scale hopper bin, a receiver, means for conducting measured amounts of material from the scale hopper bin to the receiver, and means operable upon the discharge of a predetermined amount of material from said third air-material separator into said scale hopper bin for selectively operating said distribution valve to place the air stream of the discharge from said material receiver in communication with the conduit means extending from the distribution valve to said second air-material separator.

8. A pulverulent material blending and conveying system comprising a supply hopper, means dividing said supply hopper into compartments for different types of pulverulent material, means for withdrawing pulverulent material from each of said compartments in predetermined amounts, a source of air under pressure, means for entraining the withdrawn material in a stream of air from said source, a first air-material separator, means for conducting said air stream to the first air-material separator, a material classifier, means for conducting material separated from the air stream in the first air-material separator to the material classifier, said material classifier dividing the material supplied thereto into a fine fraction and a coarse fraction, means for withdrawing the fine fraction from the material classifier, a second source of air under pressure, means for entraining the withdrawn fine fraction of material into a stream of air from the said second source, a second air-material separator, means for conducting said second air stream to the second air-material separator, a material receiver, means for conducting material separated from the second air stream in the second air-material separator to the material receiver, means for withdrawing the material from the material receiver, a third source of air under pressure, means for entraining the withdrawn material from the material receiver in a stream of air from the said third source, a distribution valve, means for conducting material withdrawn from the material receiver and entrained in the said third air stream to the distribution valve, a third air-material separator, conduit means extending from the distribution valve to the third air-material separator, a scale hopper bin, means within said scale hopper bin for measuring predetermined amounts of material, means for conducting material from the third air-material separator to the scale hopper bin, a receiver, means for conducting measured amounts of material from the scale hopper bin to the receiver, and means operable upon the discharge of a predetermined amount of material from said third air-material separator into said scale hopper bin for selectively operating said distribution valve to interrupt the flow of material from the distribution valve to the third air-material separator.

9. A pulverulent material blending and conveying system comprising a supply hopper, means dividing said supply hopper into compartments for different types of pulverulent material, means for withdrawing pulverulent material from each of said compartments in predetermined amounts, a source of air under pressure, means for entraining the withdrawn material in a stream of air from said source, a first air-material separator, means for conducting said air stream to the first air-material separator, a material separator, means for conducting material separated from the air stream in the first air-material separator to the material separator, said material separator dividing the material supplied thereto into a fine fraction and a coarse fraction, means for withdrawing the fine fraction from the material separator, a second source of air under pressure, said second source of air being the air separated from the material in the first air-material separator, means for entraining the withdrawn fine fraction of material in a stream of air from the said second source, a second air-material separator, means for conducting said second air stream to the second air-material separator, a material receiver, means for conducting material separated from the second air stream in the second air-material separator to the material receiver, means for withdrawing the material from the material receiver, a third source of air under pressure, means for entraining the withdrawn material from the material receiver into a stream of air from the said third source, a distribution valve, means for conducing material withdrawn from the material receiver and entrained in said third air stream to the distribution valve, a third air-material separator, conduit means extending from the distribution valve to the third air-material separator, conduit means extending from the distribution valve to the second air-material separator, a scale hopper bin, means within said hopper bin for measuring predetermined amounts of material, means for conducting material from the third air-material separator to the scale hopper bin, a receiver, means for conducting measured amounts of material from the scale hopper bin to the receiver, and means operable upon the discharge of a predetermined amount of material from said third air-material separator into said scale hopper bin for selectively operating said distribution valve to place the air stream of the discharge from said material receiver in communication with the conduit means extending from the distribution valve to said second air-material separator.

10. Apparatus for blending and dispensing pulverulent material comprising a bin for holding a body of material, two gas permeable members each having an upper material conveying surface forming the bottom wall of the bin, a discharge port in the bottom wall of the bin, the gas permeable members being inclined with respect to the horizontal with their lowermost ends opposite the discharge port, means for directing material in the bin onto the upper material conveying surface of the gas permeable members, a plenum chamber extending along and beneath each of the gas permeable members, means for introducing a gas into the plenum chambers to pass through the gas permeable members and into material on the upper material conveying surface thereof to aerate such material, a pivoted plate positioned in the discharge port, means for adjusting the position of the pivoted plate with respect to the lower ends of the gas permeable members, pneumatic conveying means communicating with the discharge port, and means for regulating the flow of aerated material from the discharge port into the pneumatic conveying means and for maintaining a pressure differential between the pneumatic conveying means and the interior of the bin.

11. Apparatus for blending and dispensing pulverulent material comprising a bin for holding a body of material, two gas permeable members each having an upper material conveying surface forming the bottom wall of the bin, a discharge port in the bottom wall of the bin, the gas permeable members being inclined with respect to the horizontal with their lowermost ends opposite the discharge port, means for directing material in the bin onto the upper material conveying surface of the gas permeable members, a plenum chamber extending along and beneath each of the gas permeable members, means for introducing a gas into the plenum chambers to pass through the gas permeable members and into material on the upper material conveying surface thereof to aerate such material, a pivoted plate positioned in the discharge port, means for adjusting the position of the pivoted plate with respect to the lower ends of the gas permeable members, a rotary feeder positioned adjacent the discharge port and including a casing having end walls and a side wall defining an enclosed cylindrical chamber, a rotor in the chamber rotatable about the axis thereof, the rotor having a plurality of blades thereon spaced about its periphery and extending radially outward therefrom to adjacent the inner wall of the chamber, the rotor, rotor blades, and casing defining a plurality of pockets, the feeder having a feeder passageway leading to the chamber for registry with the discharge port to permit delivery of material from the bin into the chamber, means for admitting gas under pressure through one of the end walls into the chamber generally parallel to the axis thereof, means for removing the gas from the chamber through the opposite end wall thereof, the flow of gas into the chamber being substantially aligned with the flow of gas out of the chamber, the places of admission of gas into the chamber and exist of gas from the chamber being spaced arcuately from the feeder passageway, whereby material in the bin is delivered in an aerated state through the discharge port into the pockets of the rotary feeder as the rotor rotates and material in the feeder pockets is blown therefrom as the pockets pass the gas admission and the gas removal means.

12. In a pulverulent material conveying system a conveying circuit comprising a material receiver, a source of air under pressure, means for withdrawing and entraining materal from the material receiver in a stream of air from the source, a distribution valve, conduit means extending from the withdrawing and entraining means to the distribution valve, means for by-passing a portion of the air from the source around the withdrawing and entraining means to the conduit extending to the distribution valve, a scale hopper bin, means within the scale hopper bin for measuring predetermined amounts of material, conduit means extending from the distribution valve to the scale hopper bin, a second conduit means extending from the distribution valve, means operable upon the discharge of a predetermined amount of material into the scale hopper for selectively operating the by-pass means to divert a portion of the air from the source around the withdrawing and entraining means, and means operable upon the discharge of a second predetermined amount of material into the scale hopper bin for selectively operating the distribution valve to divert the air-material stream to the second conduit means extending from the distribution valve.

13. Apparatus for blending and dispensing pulverulent material comprising a bin for holdng a body of materal, two gas permeable members each having an upper material conveying surface forming the bottom wall of the bin, a discharge port in the bottom wall of the bin, the gas permeable members being inclined with respect to the horizontal with their lowermost ends opposite the discharge port, means for directing material in the bin onto the upper material conveying surface of the gas permeable members, a plenum chamber extending along, and beneath each of the gas permeable members, means for introducing a gas into the plenum chambers to pass through the gas permeable members and into material on the upper material conveying surface thereof to aerate such material, a pivoted plate positioned in the discharge port, means for adjusting the position of the pivoted plate with respect to the lower ends of the gas permeable members, a pair of material impact plates positioned above the discharge port, one of said impact plates being at each side of said pivoted plate, said impact plates in part defining a space in which the pivot plate may swing, conveying means communicating with the discharge port, and means for regulating the flow of aerated material from the discharge port into the conveying means.

References Cited in the file of this patent
UNITED STATES PATENTS

| Number | Name | Date |
|---|---|---|
| 287,033 | Lewis | Oct. 23, 1883 |
| 1,565,893 | Bergman | Dec. 15, 1925 |
| 1,937,747 | Creasey | Dec. 5, 1933 |
| 1,941,429 | Berger | Dec. 26, 1933 |
| 2,374,584 | Cannon | Apr. 24, 1945 |
| 2,572,862 | Israel | Oct. 30, 1951 |
| 2,634,170 | Smith | Apr. 7, 1953 |
| 2,681,748 | Weller | June 22, 1954 |
| 2,688,517 | Riordan | Sept. 7, 1954 |
| 2,688,518 | Krenke | Sept. 7, 1954 |
| 2,694,496 | Atkinson | Nov. 16, 1954 |